(12) United States Patent
Jeon et al.

(10) Patent No.: US 9,561,795 B2
(45) Date of Patent: Feb. 7, 2017

(54) VEHICLE COLLISION AVOIDANCE APPARATUS AND METHOD

(71) Applicant: Hyundai Motor Company, Seoul (KR)

(72) Inventors: Dae Seok Jeon, Gyeonggi-do (KR); Suk Ki Min, Gyeonggi-do (KR); Dong Hyun Sung, Seoul (KR)

(73) Assignee: Hyundai Motor Company, Seoul (KR)

( * ) Notice: Subject to any disclaimer, the term of this patent is extended or adjusted under 35 U.S.C. 154(b) by 262 days.

(21) Appl. No.: 14/445,436

(22) Filed: Jul. 29, 2014

(65) Prior Publication Data

US 2015/0329112 A1   Nov. 19, 2015

(30) Foreign Application Priority Data

May 16, 2014   (KR) .................. 10-2014-0059032

(51) Int. Cl.
| | |
|---|---|
| *B60W 30/09* | (2012.01) |
| *B60W 10/20* | (2006.01) |
| *B60W 10/18* | (2012.01) |
| *B60W 30/08* | (2012.01) |
| *B60W 30/085* | (2012.01) |
| *B60W 40/02* | (2006.01) |
| *B60W 40/10* | (2012.01) |

(52) U.S. Cl.
CPC .............. *B60W 30/08* (2013.01); *B60W 10/18* (2013.01); *B60W 10/20* (2013.01); *B60W 30/085* (2013.01); *B60W 30/09* (2013.01); *B60W 40/02* (2013.01); *B60W 40/10* (2013.01); *B60W 2550/10* (2013.01)

(58) Field of Classification Search
None
See application file for complete search history.

(56) References Cited

U.S. PATENT DOCUMENTS

| | | | | |
|---|---|---|---|---|
| 5,959,552 | A * | 9/1999 | Cho ...................... | B60R 19/205 180/167 |
| 2004/0090117 | A1* | 5/2004 | Dudeck .................. | B60T 7/22 303/191 |
| 2012/0265418 | A1* | 10/2012 | Foerster ................. | B60T 7/22 701/70 |
| 2014/0350813 | A1 | 11/2014 | Jeon et al. | |

FOREIGN PATENT DOCUMENTS

| | | |
|---|---|---|
| KR | 10-1998-0083117 | 12/1998 |
| KR | 10-2009-0078976 A | 7/2009 |
| KR | 10-1188271 | 10/2012 |
| KR | 10-2013-0021789 A | 3/2013 |
| KR | 10-2014-0066037 | 5/2014 |

* cited by examiner

*Primary Examiner* — Mussa A Shaawat
*Assistant Examiner* — Kyung Kim
(74) *Attorney, Agent, or Firm* — Mintz Levin Cohn Ferris Glovsky and Popeo, P.C.; Peter F. Corless

(57) ABSTRACT

A vehicle collision avoidance apparatus and method are provided. The method includes identifying, by a controller, whether an obstacle is a vehicle or a pedestrian and collecting information required for calculating a minimum braking time and a minimum steering time. The controller is configured to calculate the minimum braking time to avoid a collision with the obstacle and the minimum steering time to avoid a collision with an obstacle. In addition, the a controller is configured to sequentially operating braking and steering of a traveling vehicle based on the minimum steering time depending on a type of identified obstacle.

12 Claims, 3 Drawing Sheets

VEHICLE COLLISION AVOIDANCE APPARATUS AND METHOD

CROSS-REFERENCE TO RELATED APPLICATION

This application is based on and claims priority from Korean Patent Application No. 10-2014-0059032, filed on May 16, 2014 in the Korean Intellectual Property Office, the disclosure of which is incorporated herein in its entirety by reference.

BACKGROUND

Field of the Invention

The present invention relates to a vehicle collision avoidance apparatus and method, and more particularly, to a technology for differently setting the timing of Autonomous Emergency Braking and the timing of the Autonomous Emergency Steering based on a type of obstacle, while sequentially performing Autonomous Emergency Braking and Autonomous Emergency Steering to avoid a potential collision with the obstacle.

Description of the Prior Art

A conventional collision avoidance apparatus is configured to calculate the distance (hereinafter, referred to a braking avoidance distance) to avoid a collision with an obstacle by braking and calculate the distance (hereinafter, referred to a steering avoidance distance) to avoid a collision with an obstacle by steering, and then based on this, determine the collision risk and output a warning regarding the collision or perform the auto-braking. The braking avoidance distance is calculated using a speed of the vehicle, an acceleration of the vehicle, a relative speed, a relative acceleration, a delay time, and a target longitudinal acceleration value, and the steering avoidance distance is calculated using a speed of the vehicle, a relative speed, a delay time, and a target lateral acceleration value. Generally, since the braking distance of a vehicle is proportional to the square of the speed, when a vehicle drives at a substantially high speed, the collision avoidance by braking control alone may be difficult.

SUMMARY

Accordingly, the present invention provides a vehicle collision avoidance apparatus and method thereof that more stably avoids an obstacle by optimizing the timing intervened by the auto-braking and the auto-steering, by setting the timing of Autonomous Emergency Braking and the timing of the Autonomous Emergency Steering differently based on the type of obstacle, while sequentially performing Autonomous Emergency Braking and Autonomous Emergency Steering to avoid a potential collision with the obstacle.

The object of the present invention is not limited to the above-mentioned object, and, not mentioned, other objects and advantages of the present invention can be understood by the following description, and they will become apparent by exemplary embodiments of the present invention. Also, it will be seen that the objects and advantages of the present invention can be more easily realized by means described in the claims and combination thereof.

According to the present invention, the vehicle collision avoidance apparatus may include an obstacle identifier configured to identify whether an obstacle is a vehicle or a pedestrian; an information collector configured to collect information required for calculating a minimum braking time and a minimum steering time; a minimum braking time calculator configured to calculate the minimum braking time to avoid a collision with the obstacle; a minimum steering time calculator configured to calculate the minimum steering time to avoid a collision with an obstacle; and a controller configured to sequentially operate braking and steering of the vehicle based on the minimum steering time based on a type of obstacle identified by the obstacle identifier. The controller may be configured to operate the obstacle identifier, the information collector, the minimum braking time calculator, and the minimum steering time calculator.

Further, according to the present invention, the vehicle collision avoidance method may include identifying whether an obstacle is a vehicle or a pedestrian; collecting information required for calculating a minimum braking time and a minimum steering time; calculating the minimum braking time to avoid a collision with the obstacle; calculating the minimum steering time to avoid a collision with an obstacle; and sequentially operating braking and steering of the vehicle based on the minimum steering time depending on a type of obstacle.

The invention as the above described, has the effect of more stably avoiding an obstacle by optimizing the timing intervened by the auto-braking (Autonomous Emergency Steering) and the auto-steering (Autonomous Emergency Steering), by setting the timing of the auto-braking and the timing of the auto-steering differently based on the type of obstacle, while sequentially performing the auto-braking and the auto-steering to avoid collision with obstacles.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION

Figure 1:
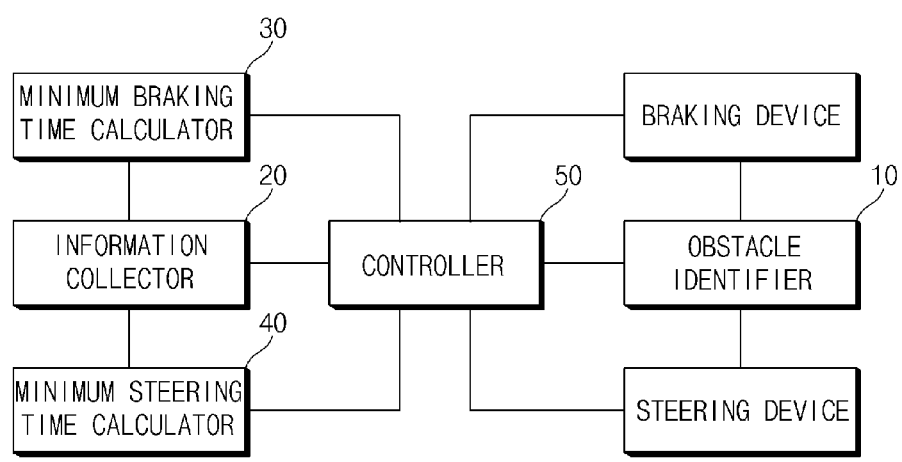
FIG. 1 is an exemplary diagram for a vehicle collision avoidance apparatus according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

The foregoing objects, features and advantages will be more apparent through the detail description as below with reference to the accompanying drawings, and thus the those skilled in the art can be easily embody the technical spirit of the present invention. Further, in the following description of the present invention, if it is determined that the detailed description for the known art related to the present invention unnecessarily obscures the gist of the present invention, the detailed description thereof will be omitted. Hereinafter, with reference to the accompanying drawings, exemplary embodiments of the present invention will be described in detail.

FIG. 1 is an exemplary diagram for a vehicle collision avoidance apparatus according to an exemplary embodiment of the present invention. As shown in FIG. 1, the vehicle collision avoidance apparatus may include an obstacle identifier 10, an information collector 20, a minimum braking time calculator 30, a minimum steering time calculator 40, and a controller 50. The controller 50 may include a memory and a processor and may be configured to operate the obstacle identifier 10, the information collector 20, the minimum braking time calculator 30, and the minimum steering time calculator 40.

The obstacle identifier 10 may be configured to identify or determine whether the obstacle is a vehicle or a pedestrian. In particular, the obstacle identifier 10 may be configured to detect a width of the obstacle, and then when the width is less than about 1 m, the obstacle may be identified as a pedestrian (including a motorcycle, a bicycle, a stroller), and when the width is greater than about 1 m, the obstacle may be identified as a vehicle. In addition, the information collector 20 may be configured to collect information required for calculating the minimum braking time, the information required for calculating the minimum steering time, and the information required for calculating TTC (Time-To-Collision). The TTC may be a value determined by dividing the distance between the vehicle (e.g., the vehicle being driver, the subject vehicle) and an obstacle (e.g., another vehicle, a pedestrian, etc.) by a relevant speed using a vehicle communication network The information may be collected by interworking with various ECUs (Electronic Control Units). The vehicle communication may include CAN (Controller Area Network), LIN (Local Interconnect Network), FlexRay and the like.

The information required for calculating the minimum braking time may include a relevant speed with an obstacle, a longitudinal acceleration, a friction coefficient, gravity acceleration and the like. In particular, the friction coefficient generally means the friction coefficient (e.g., a constant) on a paved road. The information required for calculating the minimum steering time may include a relevant speed with an obstacle, a lateral acceleration, the amount overlapped with an obstacle, a friction coefficient, gravity acceleration and the like. In particular, the amount of overlap with an obstacle may be the amount which the obstacle is covered on the basis of the width of the vehicle (e.g., a portion in which the obstacle and the vehicle are aligned next to each other which may be a partial or full overlap). For example, when the vehicle is in alignment with the obstacle (e.g., the obstacle and the vehicle are next to each other), a full overlap may be determined. Further, the information required for calculating TTC may include a distance with an obstacle, a relevant speed with an obstacle and the like. The minimum braking time calculator 30 may be configured to calculate the minimum braking time ($t_{LPB}$) required to allow the vehicle to avoid the collision with the obstacle by following Equation 1.

$$t_{LPB} = \frac{d_{LPB}}{-v_{rel}} = -\frac{v_{rel}}{2\mu g}, d_{LPB} = -\frac{v_{rel}^2}{2a_x} \qquad \text{Equation 1}$$

wherein, $v_{rel}$ means the relevant speed with the obstacle, $d_{LPB}$ means the limited braking distance, $a_x$ means the longitudinal acceleration, $\mu$ means the friction coefficient, and g means gravity acceleration, respectively.

Additionally, the minimum steering time calculator 40 may be configured to calculate the minimum steering time ($t_{LPS}$) required to allow the vehicle to avoid the collision with the obstacle by following Equation 2.

$$t_{LPS} = \frac{d_{LPS}}{-v_{rel}} = \sqrt{\frac{2s_y}{\mu g}}, d_{LPS} = -v_{rel}\sqrt{\frac{2s_y}{a_y}} \qquad \text{Equation 2}$$

wherein, $d_{LPS}$ means the limited steering distance, $s_y$ means the amount overlapped with the obstacle, $a_y$ means the lateral acceleration, $\mu$ means the friction coefficient, and g means gravity acceleration, respectively. At this time, since $s_y$ value may vary based on the type of obstacle (e.g., a vehicle, a pedestrian), the minimum steering times may be different from each other.

Further, the controller 50 may be configured to periodically calculate the TTC, and then compare the minimum braking time and the minimum steering time and operate the braking device and the steering device accordingly In other words, the controller 50 may be configured to stop or brake the vehicle despite driver the intention in response to reaching the minimum braking time. When the collision with the obstacle may not be avoided by braking due to the obstacle suddenly appearing (in this case, when the minimum braking time is calculated, it is already the past time, that is, the minimum braking time has elapsed), the controller 50 may be configured to first operate the braking of the vehicle (e.g., engage the brake), and then operate the steering device to cause the vehicle to deviate from the driving lane when reaching the minimum steering time.

When the timing at which the obstacle appears, is greater than the minimum steering time, since the collision with the obstacle may not be avoided, the above method may minimize the damage caused by the collision by operating the braking of the vehicle. Further, when the timing at which the obstacle appears, is the minimum steering time, it may be possible to directly operate the steering device without braking the vehicle (e.g., without operating the vehicle braking system). The present invention may therefore allow the vehicle to avoid the collision with the obstacle by properly performing the braking and the steering when the obstacle appears after the minimum braking time is elapsed.

Figure 2:
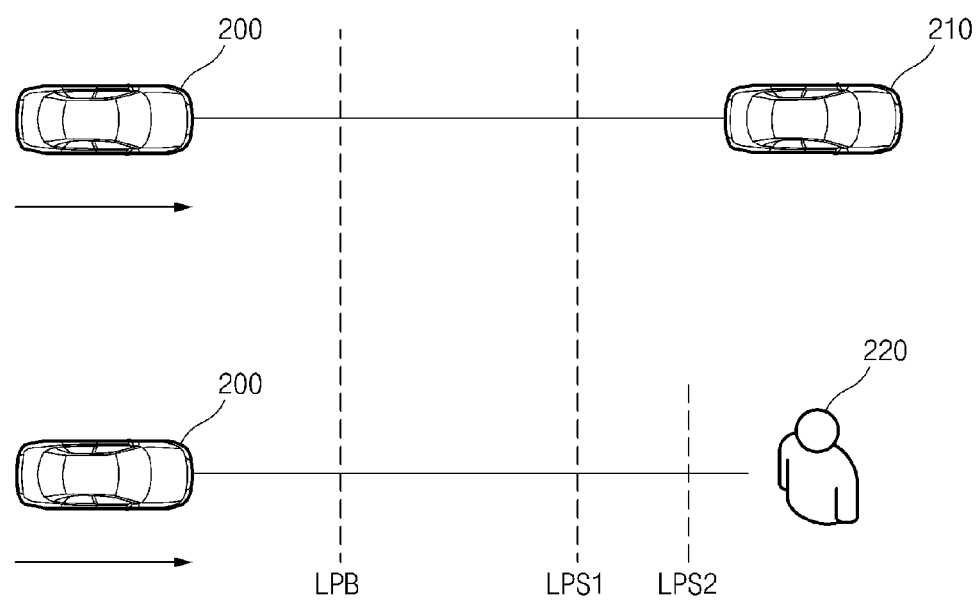
FIG. 2 is an exemplary diagram for a vehicle collision avoidance scheme according to the exemplary embodiment of the present invention.

Hereinafter, with reference to FIG. 2, the operation of the controller 50 will be described. In FIG. 2, it will be explained by comparing the case in which the obstacle is the preceding vehicle 210 and the case in which the obstacle is the pedestrian 220. First, 'LPB' is referred to as the timing required for the vehicle 200 to avoid the collision with the obstacles 210, 220 by braking, 'LPS1' is referred to as the timing required for the vehicle 200 to avoid the collision with the preceding vehicle 210 by steering when the obstacle is the preceding vehicle 210, and 'LPS2' is referred to as the timing required for the vehicle 200 to avoid the collision with the pedestrian 220 by steering when the obstacle is the pedestrian 220.

In particular, the timing of 'LPS1' may be greater than the timing of 'LPS2'. In other words, when the obstacle is a vehicle, the traveling vehicle 200 may be steered in the timing earlier than (e.g., sooner than or faster than) the case in which the obstacle is the pedestrian to avoid a collision. Additionally, 'LPB' may have about the same value regardless of the type of obstacle when the obstacle is stationary or when the speed is about same.

Further, the controller 50 may be configured to identify or determine the type of obstacle (e.g., a vehicle, a pedestrian) by operating the obstacle identifier 10, and then, based on the minimum steering time according to the result, sequentially operate the braking and the steering of the vehicle. In other words, the controller may be configured to operate the steering of the vehicle on the first timing (LPS1) after operating the braking of the vehicle, when the obstacle is a vehicle, and operate the steering of the vehicle on the second timing (LPS2) after operating the braking of the vehicle, when the obstacle is a pedestrian. Particularly, when a vehicle appears after the first timing (LPS1) and when a pedestrian appears after the second timing (LPS2), the damage caused by a potential collision may be reduced by operating only the braking of the vehicle. Additionally, the controller 50 may be configured to output a warning to the driver via a buzzer (e.g., or any other warning device) before the minimum brake time is reached. In other words, when the minimum braking time is within a threshold time range, the buzzer may output a sound to warn a driver of the obstacle. For example, when the minimum braking time is 3 seconds and the threshold is 2 seconds, the buzzer may output a sound when the minimum braking time reaches 5 seconds.

Figure 3:
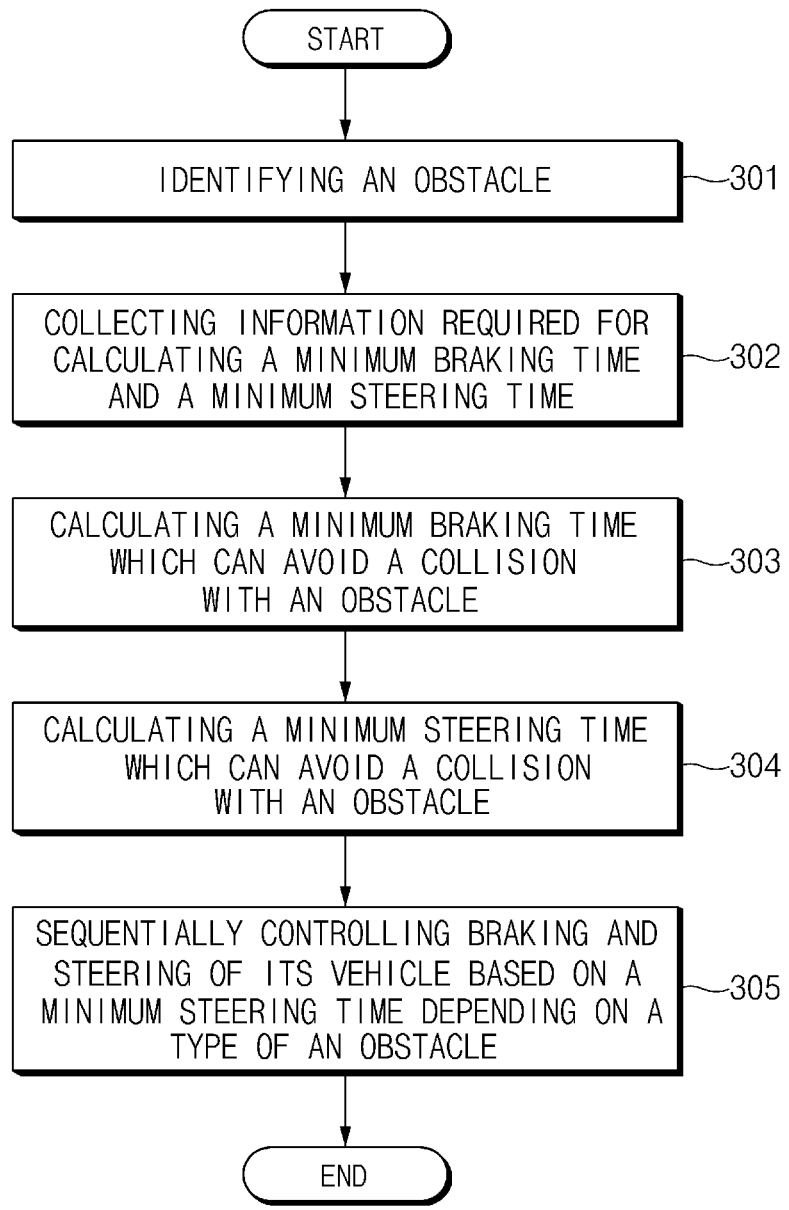
FIG. 3 is an exemplary flow chart for a vehicle collision avoidance method according to the present invention.

FIG. 3 is an exemplary flow chart for a vehicle collision avoidance method according to an exemplary embodiment of the present invention. First, the obstacle identifier 10 may be configured to determine whether the obstacle is a vehicle or a pedestrian (301). The information collector 20 may be configured to collect the information required for calculating the minimum braking time and the minimum steering time (302). Further, the minimum braking time calculator 30 may be configured to calculate the minimum braking time ($t_{LPB}$) to avoid the collision with the obstacle (303) and the minimum steering time calculator 40 may be configured to calculate the minimum steering time ($t_{LPS}$) to avoid the collision with the obstacle (304). Then, the controller 50 may be configured to sequentially operate the braking and the steering of the vehicle based on the minimum steering time depending on the type the identified obstacle (305).

Obstacles may be more reliably avoided by optimizing the intervening timing of the auto-braking and auto-steering through these procedures. Additionally, as described above, the method of the present invention may be made as a computer program. The code and code segment constituting the program may be easily inferred by a computer programmer in the art. Additionally, the made program may be stored in a computer-readable recording media (information storage medium), and may be read and executed by a computer, and thereby, the method of the present invention is implemented. The recording media may include all types of computer-readable recoding media.

As the above described, the present invention is not limited to the aforementioned exemplary embodiments and accompany drawings, since replacements, various modifications, and changes may be made without departing from the technical spirit of the present invention by those skilled in the art.

What is claimed is:

1. A vehicle collision avoidance apparatus, comprising:
   a memory configured to store program instructions; and
   a processor configured to execute the program instructions, the program instructions when executed configured to:
      identify whether an obstacle is a vehicle or a pedestrian;
      collect information required for calculating a minimum braking time and a minimum steering time;
      calculate the minimum braking time to avoid a collision with the obstacle;
      calculate the minimum steering time to avoid a collision with an obstacle; and
      sequentially operate braking and steering of a traveling vehicle based on the minimum steering time depending on a type of identified obstacle,
   wherein the program instructions when executed are further configured to:
      operate the steering of the traveling vehicle on the first timing (LPS1) after operating the braking of the traveling vehicle, when the obstacle is the vehicle; and
      operate the steering of the traveling vehicle on the second timing (LPS2) after operating the braking of the traveling vehicle, when the obstacle is the pedestrian.

2. A vehicle collision avoidance apparatus according to claim 1, wherein when the vehicle identified as the obstacle appears after the first timing (LPS1) and when the pedestrian identified as the obstacle appears after the second timing (LPS2), the program instructions when executed are further configured to operate only the braking of the traveling vehicle.

3. A vehicle collision avoidance apparatus according to claim 1, wherein the minimum braking time ($t_{LBP}$) is calculated by following Equation A $$t_{LPB} = \frac{d_{LPB}}{-v_{rel}} = -\frac{v_{rel}}{2\mu g}, d_{LPB} = -\frac{v_{rel}^2}{2a_x} \quad \text{Equation A}$$

wherein, $V_{rel}$ is a relevant speed with the obstacle, $d_{LPB}$ is a limited braking distance, $a_x$ is a longitudinal acceleration, $\mu$ is a friction coefficient, and g is gravity acceleration.

4. A vehicle collision avoidance apparatus according to claim 1, wherein the minimum steering time ($t_{LPS}$) is calculated by following Equation B $$t_{LPS} = \frac{d_{LPS}}{-v_{rel}} = \sqrt{\frac{2s_y}{\mu g}}, d_{LPS} = -v_{rel}\sqrt{\frac{2s_y}{a_y}} \quad \text{Equation B}$$

wherein, $d_{LPS}$ is a limited steering distance, $s_y$ is an amount overlapped with the obstacle, $a_y$ is a lateral acceleration, $\mu$ is a friction coefficient, and g is gravity acceleration.

5. A vehicle collision avoidance method, comprising:
identifying, by a controller, whether an obstacle is a vehicle or a pedestrian;
collecting, by the controller, information required for calculating a minimum braking time and a minimum steering time;
calculating, by the controller, the minimum braking time to avoid a collision with the obstacle;
calculating, by the controller, the minimum steering time to avoid a collision with an obstacle; and
sequentially operating, by the controller, braking and steering of a traveling vehicle based on the minimum steering time depending on a type of identified obstacle,
wherein the operating of the braking and the steering includes:
operating, by the controller, the steering of the traveling vehicle on the first timing (LPS1) after operating the braking of the traveling vehicle, in response to identifying the obstacle as the vehicle; and
operating, by the controller, the steering of the traveling vehicle on a second timing (LPS2) after operating the breaking of the traveling vehicle, in response to identifying the obstacle as the pedestrian.

6. A vehicle collision avoidance method according to claim 1, wherein the operating of the braking and the steering further comprises:
operating, by the controller, only the braking of the traveling vehicle when the obstacle identified as the vehicle appears after the first timing (LPS1) and when the obstacle identified as the pedestrian appears after the second timing (LPS2).

7. A vehicle collision avoidance method according to claim 5, wherein the calculating of the minimum braking time includes calculating the minimum braking time ($t_{LPB}$) by following Equation C $$t_{LPB} = \frac{d_{LPB}}{-v_{rel}} = -\frac{v_{rel}}{2\mu g}, d_{LPB} = -\frac{v_{rel}^2}{2a_x} \quad \text{Equation C}$$

wherein $V_{rel}$ is a relevant speed with the obstacle, $d_{LPB}$ is a limited braking distance, $a_x$ is a longitudinal acceleration, $\mu$ is a friction coefficient, and g is gravity acceleration.

8. A vehicle collision avoidance method according to claim 5, wherein the calculating of the minimum steering time includes calculating the minimum steering time ($t_{LPS}$) by following Equation D $$t_{LPS} = \frac{d_{LPS}}{-v_{rel}} = \sqrt{\frac{2s_y}{\mu g}}, d_{LPS} = -v_{rel}\sqrt{\frac{2s_y}{a_y}} \quad \text{Equation D}$$

wherein, $d_{LPS}$ is a limited steering distance, $s_y$ is an amount overlapped with the obstacle, $a_y$ is a lateral acceleration, $\mu$ is a friction coefficient, and g is gravity acceleration.

9. A non-transitory computer readable medium containing program instructions executed by a controller, the computer readable medium comprising:
program instructions that identify whether an obstacle is a vehicle or a pedestrian;
program instructions that collect information required for calculating a minimum braking time and a minimum steering time;
program instructions that calculate the minimum braking time to avoid a collision with the obstacle;
program instructions that calculate the minimum steering time to avoid a collision with an obstacle;
program instructions that sequentially operate braking and steering of a traveling vehicle based on the minimum steering time depending on a type of identified obstacle;
program instructions that operate the steering of the traveling vehicle on the first timing (LPS1) after operating the braking of the traveling vehicle, in response to identifying the obstacle as the vehicle; and
program instructions that operate the steering of the traveling vehicle on a second timing (LPS2) after operating the braking of the traveling vehicle, in response to identifying the obstacle as the pedestrian.

10. The non-transitory computer readable medium of claim 9, further comprising:
program instructions that operate only the braking of the traveling vehicle when the obstacle identified as the vehicle appears after the first timing (LPS1) and when the obstacle identified as the pedestrian appears after the second timing (LPS2).

11. The non-transitory computer readable medium of claim 9, wherein the calculating of the minimum braking time includes calculating the minimum braking time ($t_{LPB}$) by following Equation C $$t_{LPB} = \frac{d_{LPB}}{-v_{rel}} = -\frac{v_{rel}}{2\mu g}, d_{LPB} = -\frac{v_{rel}^2}{2a_x} \quad \text{Equation C}$$

wherein, $V_{rel}$ is a relevant speed with the obstacle, $d_{LPB}$ is a limited braking distance, $a_x$ is a longitudinal acceleration, $\mu$ is a friction coefficient, and g is gravity acceleration.

12. The non-transitory computer readable medium of claim 9, wherein the calculating of the minimum steering time includes calculating the minimum steering time ($t_{LPS}$) by following Equation D $$t_{LPS} = \frac{d_{LPS}}{-v_{rel}} = \sqrt{\frac{2s_y}{\mu g}}, \quad d_{LPS} = -v_{rel}\sqrt{\frac{2s_y}{a_y}} \qquad \text{Equation D}$$

wherein, $d_{LPS}$ is a limited steering distance, $s_y$ is an amount overlapped with the obstacle, $a_y$ is a lateral acceleration, $\mu$ is a friction coefficient, and g is gravity acceleration.

* * * * *